United States Patent
Callier et al.

[11] Patent Number: 5,189,602
[45] Date of Patent: Feb. 23, 1993

[54] HIGH-VOLTAGE GENERATOR WITH SELECTIVE HALF-BRIDGE AND FULL-BRIDGE OPERATION

[75] Inventors: Bernard Callier; Jean-Pierre Maynard, both of Voisins le Bretonneux, France

[73] Assignee: General Electric CGR S.A., Issy les Moulineaux, France

[21] Appl. No.: 765,488

[22] Filed: Sep. 26, 1991

Related U.S. Application Data

[63] Continuation of Ser. No. 522,149, May 11, 1990, abandoned.

[30] Foreign Application Priority Data

May 12, 1989 [FR] France ................. 89 06254

[51] Int. Cl.⁵ .......................................... H02M 3/315
[52] U.S. Cl. ........................................ 363/28; 363/71; 363/95; 378/112
[58] Field of Search ............... 363/17, 41, 95, 28, 363/37, 71; 378/104, 112

[56] References Cited

U.S. PATENT DOCUMENTS

| | | | |
|---|---|---|---|
| 3,713,018 | 1/1973 | Tscheuschner | 363/143 |
| 4,268,899 | 5/1981 | Rokas | 363/61 |
| 4,504,895 | 3/1985 | Steigerwald | 363/17 |
| 4,541,041 | 9/1985 | Park et al. | 363/41 |
| 4,680,693 | 7/1987 | Carron | 363/98 |
| 4,710,860 | 12/1987 | Tsuchiya | 363/28 |
| 4,741,010 | 4/1988 | Hino et al. | 378/105 |
| 4,742,535 | 5/1988 | Hino et al. | 378/105 |
| 4,805,081 | 2/1989 | Chambers et al. | 363/96 |
| 4,807,269 | 2/1989 | Grady | 378/104 |
| 4,845,607 | 7/1989 | Nakao | 363/143 |

FOREIGN PATENT DOCUMENTS

| | | |
|---|---|---|
| 3344105 | 6/1985 | Fed. Rep. of Germany . |
| 2415413 | 8/1979 | France . |
| 2100480 | 12/1982 | United Kingdom . |

OTHER PUBLICATIONS

IBM Technical Disclosure Bulletin vol. 31 No. 6 Nov. 1988 "Primary controlled automatic line select circuit".
IBM Technical Disclosure Bulletin vol. #28, No. 3 Aug. 1985 Automatic input selecting power supply.

*Primary Examiner*—William H. Beha, Jr.
*Attorney, Agent, or Firm*—Oblon, Spivak, McClelland, Maier & Neustadt

[57] ABSTRACT

An assembly is made enabling an inverter of a high-voltage generator to pass from a full-bridge use to a half-bridge use, in replacing a connection circuit of a mid-point of a first rectifier of this generator at a mid-point of the inverter by a circuit that is frequency controlled at the rate at which the inverter itself is controlled. By this approach, the two assemblies are made compatible and it becomes possible to pass from one assembly to the other as a function either of a high power to be supplied or of a ripple, which cannot be tolerated, of a residual voltage rectified by a second rectifier.

8 Claims, 2 Drawing Sheets

HIGH-VOLTAGE GENERATOR WITH SELECTIVE HALF-BRIDGE AND FULL-BRIDGE OPERATION

This application is a continuation of application Ser. No. 07/522,149, filed on May 11, 1990, now abandoned.

BACKGROUND OF THE INVENTION

1. Field of the Invention

An object of the invention is a high-voltage generator with a wide dynamic range of power, capable of being used particularly in medicine to supply an X-ray tube. At the same time, it could be used in other fields where high values of power of some hundreds of kilowatts, at very high voltages, of the order of hundreds of kilovolts, are also encountered.

2. Description of the Prior Art

Problems related to the dynamic range of power are encountered essentially when a DC high voltage produced by a generator has to be regulated irrespectively of the power consumed by the load into which this generator delivers power. This can be explained as follows: The high-voltage generators commonly used have a rectifier that converts a low-voltage AC signal given by an electrical distribution network into a low-voltage DC signal. This DC signal is then introduced into a high-frequency inverter, often a resonant inverter, which converts it into a high-frequency AC signal. The voltage of the high-frequency AC signal is then amplified by a voltage step-up transformer. The high-voltage signal is then rectified by a second rectifier to deliver the DC high voltage supply signal of a generator.

In medical applications, this high voltage is used to supply an X-ray tube. The reason for using a high-frequency inverter lies in the amount of space taken up by the capacitors of the second rectifier. For, if this second rectifier is a high-frequency rectifier, the capacitances needed to dampen the ripples of the rectified alternations are all the lower as the frequency of the signal to be rectified is high. In a resonant inverter, electrical current is made to flow in a resonant LC circuit, generally serial, alternating in one direction and then in the other. It is this AC signal that has high voltage and is subsequently rectified. The rectifying of this AC signal, despite a careful choice of the capacitors of the second rectifier, is never perfect. This rectified signal has residual ripples prompted by the electrical consumption in the load: namely, in the X-ray tube. These ripples are proportional to the supply voltage.

When the generator delivers power in a high power mode, all the components are used to the maximum of their ability to perform and ultimately a certain degree of ripple which cannot be got rid of is tolerated. This ripple has the drawback of causing variation in the supply of high voltage to the X-ray tube and, ultimately, of modifying the hardness of the X-radiation emitted by this tube throughout this ripple. This happens, of course, to the detriment of the quality of the radiographic images that can be obtained with such tubes. On going into half-power mode or into a lower power mode, in keeping the same supply voltage and the same component elements, this residual ripple of the high voltage persists, prompting the same effects.

To overcome this drawback, it has already been proposed to use so-called half-bridge inverters instead of so-called full-bridge inverters. In this case, a mid-point is created at the first rectifier of the generator. This mid-point is such that the DC voltage at this mid-point is half of the DC voltage delivered by this first rectifier. A resonant (series) LC circuit is then supplied alternately between this mid-point and each of the two supply terminals of the first rectifier. Under these conditions, the resonant circuits are finally subjected to a supply which is half that in the previous case. The result thereof is that the residual ripples of the high voltage produced are then halved. With a view to reducing costs, it has become customary to use a part of the full-bridge inverters to convert them into half-bridge inverters. In this case, a mid-point of a full-bridge inverter is used, connected to the mid-point of the first rectifier. The connection is made by means of a switch. When this switch is open, the inverter is used as a full bridge. When the switch is closed, the inverter is used as a half bridge.

Such devices, however, have the drawback of not being compatible with one another. For, the switch is an electromechanical switch with a build-up time, when turned on, of about 100 ms. For a medical type of application, this is too long. It will be noted that the ripple frequencies of inverters are generally 10 to 20 KHz. The effect of this incompatibility is that the procedures for using the inverters have to be properly differentiated. In particular, in the invention, it is sought to resolve the problem of reducing the build-up time in a low-power mode by using the fast build-up time characteristics of the full-bridge inverter, during the rising stage of the rectified high voltage. Then, the inverter is switched over to use as a half-bridge inverter as soon as the high voltage is set up because, in the experiments conducted, the operation would be in a low-power mode. The above-mentioned incompatibility among prior connection systems does not allow such switching. The result of this is that, at low power, the generators still have high build-up times whereas they would be capable of faster delivery, for example delivery in one millisecond, of the high voltage expected of them if they were to be supplied as a full bridge. They would have a residual ripple also twice as small if, once this high voltage is reached, it were possible to switch over the inverter of the full-bridge assembly into a half-bridge assembly.

The device of the invention enables precisely this result to be achieved. In particular, it also enables an automatic passage from use as a half bridge to use as a full bridge and vice versa. This passage therefore becomes transparent to the user who no longer has to determine the procedures of use (high power or low power) beforehand. This automatic passage thus enables the generator to work permanently under optimal conditions of the lowest residual ripple given the power required by the load.

The principle of the invention is based on the replacement of the switch which enables the mid-point of the half bridge to be connected to the mid-point of the rectifier by a switch controlled at the high ripple frequency of the inverter. In one particular variant, this switch is even set up by placing two thyristors, in a back to back arrangement, each of these thyristors being triggered alternately, twice in sucession.

SUMMARY OF THE INVENTION

The invention therefore concerns a high-voltage generator with a wide range of power comprising:

a first AC-DC rectifier to rectify a low-voltage, low-frequency AC electrical signal into a low-voltage DC signal;

a full-bridge inverter controlled at high frequency to convert this low-voltage DC signal into a low-voltage, high-frequency AC signal;

a transformer to raise the voltage of this low-voltage, high-frequency AC signal;

and a second rectifier to convert a high-voltage, high-frequency AC signal thus obtained into a high-voltage DC signal, comprising a connection circuit controlled at high frequency to connect a mid-point of the first rectifier to a mid-point of the full-bridge inverter, when the generator is used at low power.

BRIEF DESCRIPTION OF THE DRAWINGS

The invention will be understood more clearly from the following description and from the appended figures. These figures are given purely by way of indication and in no way restrict the scope of the invention. Of these figures.

DESCRIPTION OF A PREFERRED EMBODIMENT

Figure 1:
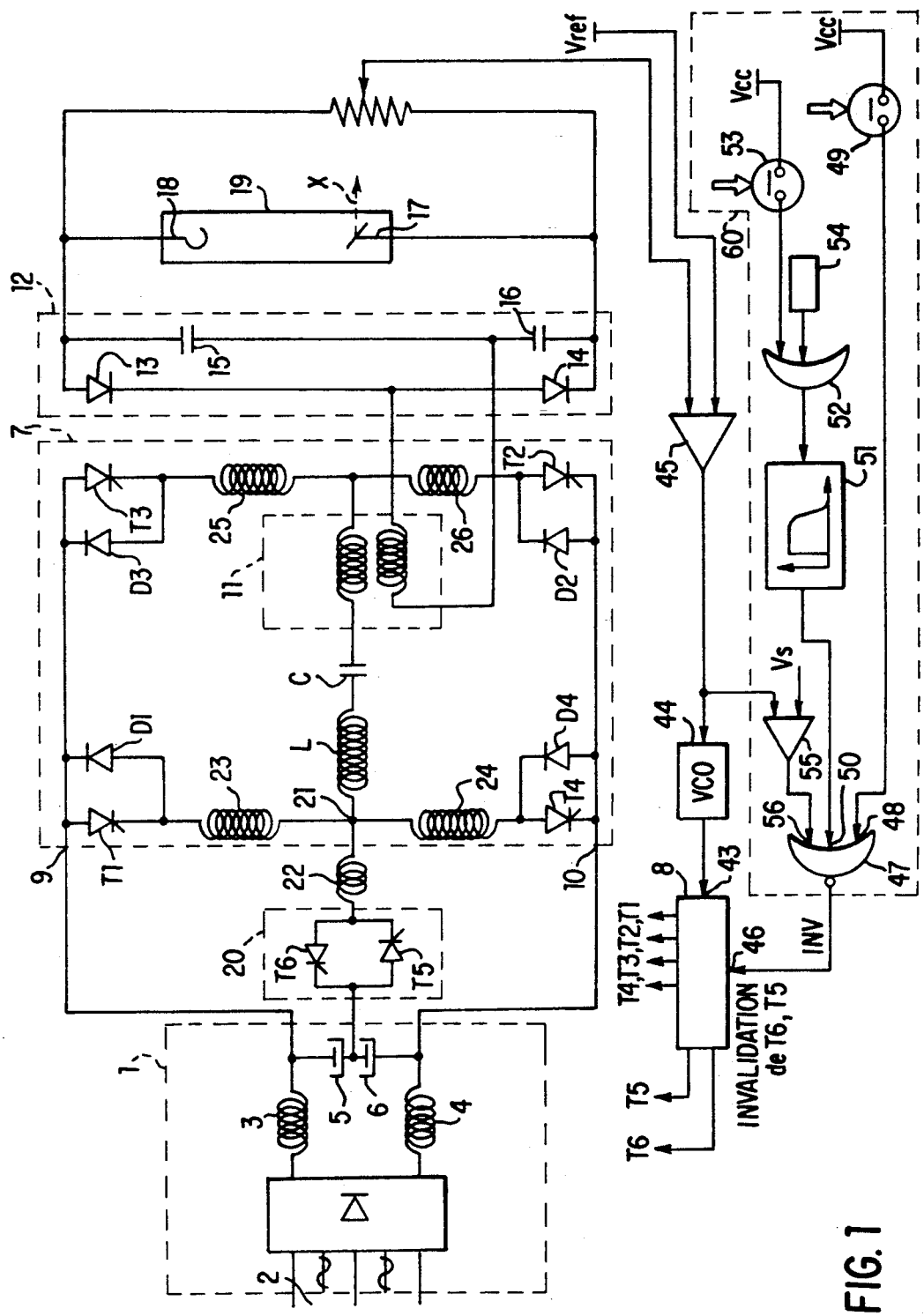
FIG. 1 shows a schematic view of the generator of the invention.
Figure 2A:
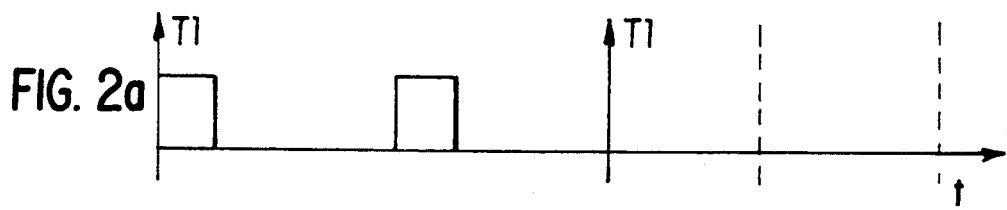
FIG. 2 shows timing diagrams of signals emitted by a circuit for controlling the inverter; this control circuit preferably controls also the connection circuit.
Figure 2B:
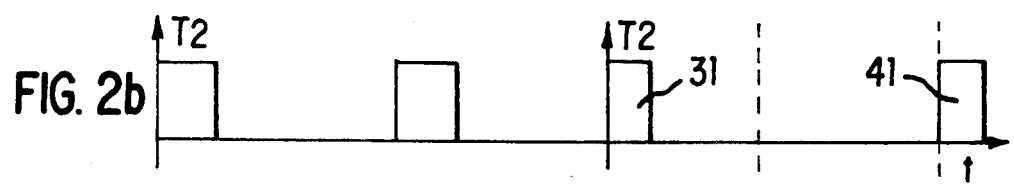
Figure 2C:
Figure 2D:
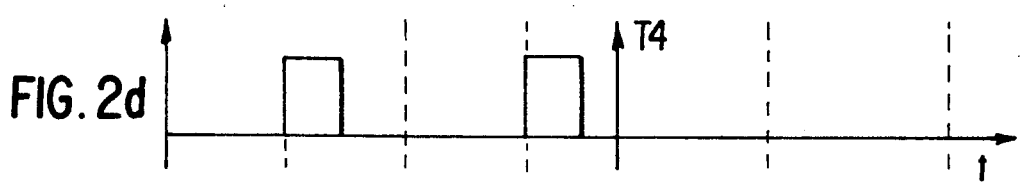
Figure 2E:
Figure 2F:
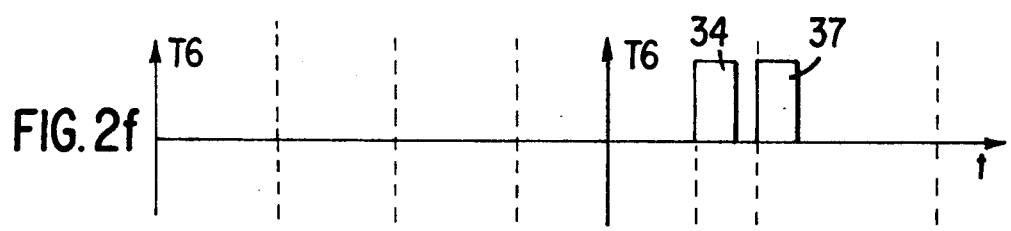
Figure 2G:
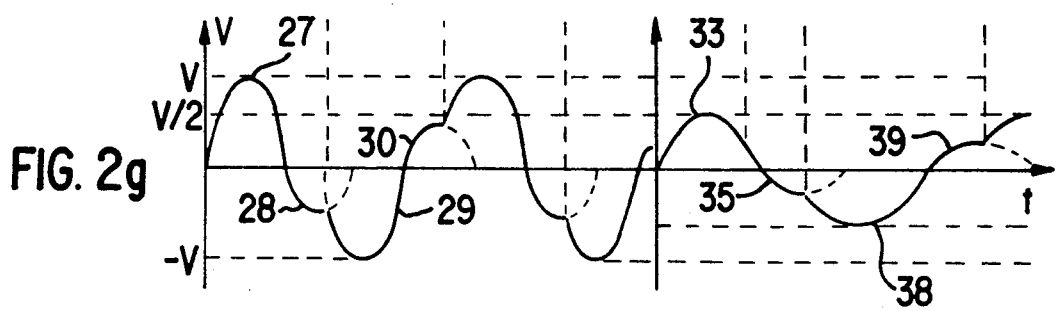

FIG. 1 shows a high-voltage generator with a wide range of power according to the invention. This generator has a first rectifier 1 which receives a low-frequency, low-voltage electrical signal of power normally distributed by an electrical distribution network 2. In one example, this first rectifier 1 has two series-mounted choke-type inductors 3 and 4 which are series-connected on either side with two series-mounted capacitors 5 and 6. The mid-point of the capacitors 5 and 6 acts as the rectifier output mid-point. The mutually non-connected terminals of the capacitors 5 and 6 deliver the extreme potentials (0 volt and 600 volts in one example) produced by the first rectifier 1.

The generator also has a full-bridge inverter 7, controlled at high frequency by a control circuit 8 to deliver a low-voltage (of the order of 600 volts), high-frequency AC signal. The full-bridge inverter is normally connected to the end terminals 9 and 10 of the rectifier 1. The inverter shown here is a resonant inverter having a series LC circuit connected in an intermediate position to two symmetrical bridges of thyristors. A first bridge of thyristors comprises the thyristor $T_1$ and the thyristor $T_2$. The thyristor $T_1$ is connected between the input terminal 9 of the inverter 7 and a terminal of the inductor of a resonant LC circuit. The other terminal of the inductor is connected to a terminal of the capacitor C. The other terminal of the capacitor C is connected, indirectly, to the anode of the thyristor $T_2$. The cathode of the thyristor $T_2$ is furthermore connected to the output terminal 10 of the inverter. The inverter 7 also has a second bridge of thyristors $T_3$ and $T_4$, the anodes and cathodes of which are connected, in a manner comparable to the anodes and cathodes of the thyristors $T_1$ and $T_2$, to the terminals 9 and 10 of the inverter, on the one hand, and to the terminals of the series LC circuit on the other hand. The second bridge $T_3$ and $T_4$ is, however, connected in such a way that the current it induces in the LC circuit when these thyristors $T_3$ and $T_4$ are triggered is in the reverse direction to the current that results from turning on the thyristors $T_1$ and $T_2$. The thyristors are provided with triggers shown by small slanting lines. These triggers receive signals $t_1$ to $t_4$ produced by the control logic circuit 8.

Between the terminal of the capacitor C, which is not connected to the inductor L, and a first mid-point in an intermediate position between the thyristors $T_3$ and $T_2$, there will be connected a transformer 11. The transformer 11 is a step-up transformer, the secondary winding of which is connected to a second rectifier 12. The rectifier 12 has, in one example, a series of two diodes, 13 and 14, connected in parallel with a series of two capacitors 15 and 16. The secondary winding of the transformer 11 is connected between the mid-points of the diodes and of the capacitors. The rectified output of the rectifier 12 is available at the connection points of these two parallel circuits. In one example, the high voltage delivered by the rectifier 12 is applied to the anode 17 and to the cathode 18 of an X-ray tube 19.

The circuit of the invention also includes a switch 20 placed between the mid-point of the output of the first rectifier 1 and a second mid-point of the inverter 7. The second mid-point of the inverter 7 to which the switch 20 is connected is the one located at the terminal 21 of the inductor L. This terminal 21 is not connected to the capacitor C.

FIG. 2 shows timing diagrams that make it possible to understand the working of the invention. This FIG. 2 has two parts: a left-hand part where the inverter is used as a full bridge and a right-hand part where it is used as a half-bridge. In use as a half-bridge, less energy is expected to be consumed, and advantage is taken of this fact to reduce the rate of residual ripple of the voltage rectified by the second rectifier 12. The left-hand part of the figure corresponds to a standard mode of operation. In this operation, the logic control circuit 8 receives a disabling signal INV that neutralizes the switch 20.

In the invention, the switch 20 has two thryistors $T_5$ and $T_6$, mounted back to back and in parallel. This means that the anode of one thyristor is connected to the cathode of the other thyristor and vice versa. These two thyristors in parallel are series-mounted in the switch 20. Furthermore, to improve the working of the switch as well as that of the inverter 7, over-oscillation inductors 22 to 26 are placed in series in the switch and in the different branches of the circuit of the inverter.

When the X-ray tube 19 has to be put into operation, in a standard mode of use, the control circuit 8 is made trigger the thyristors $T_1$ and $T_2$ (see FIG. 2). Under these conditions, the current is set up in the LC circuit of the inverter 7 in a positive half-wave 27. This half-wave culminates in a voltage V that depends on the factor of overvoltage of the LC circuit and on the voltage delivered by the rectifier 1. The resonant LC circuit then induces a reverse current negative half-wave 28. The current reversal is achieved by diodes $D_2$ and $D_1$ connected in parallel to the thyristors $T_2$ and $T_1$ respectively. The effect of this reverse current is to complete the turning off of the thyristors $T_1$ and $T_2$. At a subsequent instant, which may be located during the negative half-wave 28, the second bridge of thyristors $T_3$ and $T_4$ is triggered so as to produce a negative half-wave 29. This negative half-wave culminates at the voltage $-V$ in taking over from the feedback half-wave 28. The half-wave 29 gives rise, by feedback, to a half-wave 30 that enables the thyristors $T_3$, $T_4$ to be turned off again by means of the diodes $D_3$, $D_4$. The phenomenon is perpetuated if the thyristors $T_1$ and $T_2$ are again activated.

The inverter is normally controlled at high frequency. The voltage indicated at the bottom of FIG. 2 is substantially an AC voltage. It is ultimately the voltage to which the primary winding of the step-up transformer 11 is subjected. It will produce the expected high-power high voltage. The invention then works as follows.

Just as, in the working of the full-bridge inverter 7, the thyristors $T_5$ and $T_6$ are never acted upon, so in the half-bridge use the thyristors $T_1$ and $T_4$ will never be acted upon. During a first half-wave, by means of the circuit 8, the thyristor $T_2$ is triggered by a pulse 31 and the thyristor $T_5$ is triggered by a simultaneous pulse 32. Under these conditions, a first half-wave 33 develops in the LC circuit, with the current going from the left-hand side to the right-hand side of the figure. Indeed, at this moment, the LC circuit is supplied between the terminal 10 and the mid-point of the first rectifier 1. Before this half-wave 33 is reversed, a pulse 34 is used to trigger the thyristor $T_6$, mounted back to back and in parallel with the thyristor $T_5$. This thyristor $T_6$ will then play the same role for the thryistor $T_5$ as that played by the diode $D_2$ for the thyristor $T_2$. The thryistor $T_6$ and the diode $D_2$ provide for the return of the current of the feedback half-wave 3 as a consequence of the half-wave 33.

Then, at a following instant, which may be located during the feedback half-wave 35, a pulse 36 of the thyristor $T_3$ is triggered at the same time as a second pulse 37 of the thyristor $T_6$. In doing so, the LC circuit is now kept supplied between the terminal 9 and the mid-point of the rectifier 1. A half-wave 38 of current develops, with an amplitude symmetrical to that of the half-wave 33. It will be noted that these half-waves 33 and 38 have an amplitude which is half that of the previous half-waves 27 and 29. The result thereof is that the rectifier 12 will produce a rectified signal with less residual ripple. Indeed, the half-waves 33 and 38 culminate in voltages of the order of V/2. Another result of the turning on of the thyristor $T_6$ is that it improves the operation of again turning off the thyristor $T_5$. Hence, to provide for the reverse current of the feedback half-wave 39 following the half-wave 38, a pulse 42 is used to retrigger the thyristor $T_5$. Continuing in this way, the phenomenon starts again and, at a following period, the thyristors $T_2$ and $T_5$ are again activated by control pulses 41 and 42.

In the same way as the pulse 37 for activating the thyristor $T_6$ followed the pulse 34, it is observed that the pulse 42 follows the pulse 40. Consequently, at each cycle of the AC signal to be rectified in the transformer 11, each of the thyristors $T_5$ and $T_6$ is triggered twice in succession. This precaution ensures operation, should it become necessary, owing to the regulation, to await the end of the feedback half-waves 35 or 32 before retriggering the thyristors $T_3$ or $T_2$.

If the full-bridge inverter is controlled by the logic circuit 8 at a frequency of the order of 20 KHz, the pulses at the thyristors $T_1$ to $T_4$ are given at a rate of 20 KHz, but two of them are phase-shifted by a half-period. By contrast, in half-bridge operation, while the control of the thyristors is also applied at the rate of 20 KHz, it is furthermore increased by the presence of the intermediate pulses 34 or 40. The pulse 34, like the pulse 40, should preferably be triggered while the thyristor that they trigger is still reverse biased so that it is effectively already closed when the half-wave gets reversed. As a consequence, the pulses 34 and 40 should be long enough not to cease when the signal in the LC resonant circuit gets reversed.

It is possible to fabricate control logic circuits 8 such that they enable the activation of the thyristors $T_1$ to $T_6$ as shown in FIG. 2. However, in the invention, the performance of such a circuit is used to lead simply to other functions. In a standard way, the circuit 8 has an input 43 to receive a signal delivered by a frequency-controlled oscillator 44, receiving an error signal delivered by a comparator 45. The comparator 45 compares a reference voltage $V_{ref}$ with a voltage U taken at the terminals of the tube 19. Depending on the error signal, the frequency of application of the pulses for activating the thyristors $T_1$ to $T_6$ is modified. This means that, in either case, the duration between the pulses 31 and 41 or 32 and 42 can be made to vary as a function of the difference between the measured voltage and the reference voltage which it is sought to impose.

By contrast, the circuit 8 has its own delay means that enable delaying the triggering of the pulse 34 of the thyristor $T_6$ with respect to the instant 32 of the triggering of the thyristor $T_5$. For, this delay is related only to the inherent resonant frequency of the LC circuit. The variations in frequency are not so great that they might cause the pulses 34 and 37 to overlap. All the same, this situation would not be truly detrimental to the working of the system.

The control circuit 8 also has a disabling input 46 which receives a disabling signal INV. The disabling mode may be of any known type. The disabling signal is delivered by a logic circuit 60 capable of carrying out additional functions. The logic circuit 60 delivers the signal INV. In one example, the logic circuit includes a NOR gate 47 which may receive, at one input 48, a signal delivered by a high power setting switch 49. For example, if a full-bridge operation of the circuit has to be enforced, the switch 49 is closed and the input 48 is subjected to a positive potential VCC. The output signal of the gate 47 is then at 0 and the circuit 8 disables the activation of the thyristors $T_5$, $T_6$ while it re-enables the activation of the thyristors $T_1$ and $T_4$.

The gate 48 has another input 50 which receives a signal delivered by a monostable circuit 51. The monostable circuit 51 is triggered by an output signal from an OR gate 52. An exposure-starting switch 53 or a cinema-type triggering circuit are connected to the OR gate 52. The circuit 53 can be handled in successive operations while the circuit 54 delivers pulses at the rate of the radiographic exposures that are to be taken with the X-ray tube 19. The gate 52 therefore delivers a long pulse or a series of pulses as the case may be. The monostable circuit 51 delivers a short pulse of a series of short pulses. The result thereof is that the half-bridge assembly is disabled for short periods of the pulses of this monostable circuit each time that exposures are started. Under these conditions, it is seen to it that, at each time that exposures are started, the power supply to the X-ray tube, by means of the rectifier 12, is started up in full-bridge mode. That is, with a build-up time of the order of 1 ms, namely the quickest possible time. During this turning-on operation, given a control frequency of 20 KHz, the control circuit 8 sends about twenty pulses to each of the thyristors $T_1$ to $T_4$.

The error signal delivered by the comparator 45 is itself compared in another comparator 55 with a voltage $V_s$ for automatically putting the full bridge into operation. Given the sign of this error signal and of the voltage $V_s$, the comparator 55 may switch over and deliver a positive signal at a logic level 1, introduced on a third input 56 of the NOR gate 47. This gate 47 then delivers a zero signal that again disables the thyristors $T_5$ and $T_6$ and enables the thyristors $T_1$ and $T_4$. As a consequence, if the power required is too high, the control circuit 8 is disabled and the residual ripple that could not be prevented is tolerated. If the power consumed is low, the voltage at the terminals of the X-ray tube 19 does not drop much and, through the comparators 45 and 55, the half-bridge operation of the inverter 7 is made possible.

What is claimed is:

1. A high-voltage generator with wide range of power comprising:
    a first AC-DC rectifier to rectify a low-voltage, low-frequency AC electrical signal into a low-voltage DC signal;
    a full-bridge inverter controlled at high frequency to convert this low-voltage DC signal into a low-voltage, high-frequency AC signal;
    a transformer to raise the voltage of this low-voltage, high-frequency AC signal;
    and a second rectifier to convert a high-voltage, high frequency AC signal thus obtained into a high-voltage DC signal, comprising:
    a connection circuit controlled at said high frequency AC electrical signal to connect a mid-point of the first rectifier to a mid-point of the full-bridge inverter, only when the generator is to be used at low power so as to serially connect a primary winding of said transformer between said mid-points,
    means for opening said connection circuit when said generator is to be used at full-power so as to connect said primary winding of said transformer to said first AC-DC rectifier in parallel,
    and means for the automatic disconnection of the connection circuit at the start of each operation pulse of the high-voltage generator.

2. A generator according to claim 1, wherein said connection circuit includes, in series in the connection, two thyristors mounted back to back and in parallel, and a control circuit to alternately trigger each of these thyristors twice in succession for successive cycles of the low-voltage, high-frequency signal to be produced.

3. A generator according to claim 2, wherein the control circuit is designed to trigger a second thyristor of this connection circuit while the first one is still on.

4. A generator according to any one of the claims 1 to 3, wherein the control circuit has means to disconnect the connection circuit when the generator is used in high-power mode.

5. A high-voltage generator with wide range of power comprising:
    a first AC-DC rectifier to rectify a low-voltage, low-frequency AC electrical signal into a low-voltage DC signal;
    a full-bridge inverter controlled at high frequency to convert this low-voltage DC signal into a low-voltage, high-frequency AC signal;
    a transformer to raise the voltage of this low-voltage, high-frequency AC signal;
    and a second rectifier to convert a high-voltage, high frequency AC signal thus obtained into a high-voltage DC signal, comprising:
    means for measuring a value of the high-voltage DC signal;
    a connection circuit controlled at said high frequency AC electrical signal to connect a mid-point of the first rectifier to a mid-point of the full-bridge inverter, only when the generator is to be used at low power so as to serially connect a primary winding of said transformer between said mid-points;
    means for opening said connection circuit when said generator is to be used at full-power so as to connect said primary winding of said transformer to said first AC-Dc rectifier in parallel;
    and means for automatic disconnection of the connection circuit when the measured high-voltage DC signal falls below a predetermined threshold.

6. A generator according to claim 5, wherein the connection circuit includes, in series in the connection, two thyristors mounted back to back and in parallel, and a control circuit to alternately trigger each of these thyristors twice in succession for successive cycles of the low-voltage, high-frequency signal to be produced.

7. A generator according to claim 6, wherein the control circuit is designed to trigger a second thyristor of this connection circuit while the first one is still on.

8. A generator according to any one of the claims 5 to 7, wherein the control circuit has means to disconnect the connection circuit when the generator is used in high-power mode.

* * * * *